3,309,210
INSULATING FIREBRICK

Charles L. Norton, Jr., William C. Bohling, and Avitus Daniel Fentzke, all of Augusta, Ga., assignors to The Babcock & Wilcox Company, New York, N.Y., a corporation of New Jersey
No Drawing. Filed Apr. 14, 1964, Ser. No. 359,775
4 Claims. (Cl. 106—64)

This invention relates to insulating firebrick adapted for use at elevated temperatures, such as 2800° F., in hydrogen or other reducing atmospheres, and it has for a general object to provide an insulating firebrick having an extended useful life in such environments.

Insulating firebrick is frequently used to line metallurgical treating chambers wherein metal articles may be annealed, brazed, sintered or otherwise heat treated. Such chambers may be provided with a protective reducing atmosphere, usually hydrogen, in order that the metal undergoing treatment will not be spoiled as a result of chemical reaction with the chamber atmosphere.

It has been found that reducing atmospheres, which are protective in respect to the metal being treated, can cause disintegration of conventional firebrick by reducing its oxidic refractory ingredients. Moreover, such reduction of oxide materials by hydrogen forms water, even small quantities of which can oxidize or otherwise spoil the metal being treated. Therefore, it is one of the main objects of the present invention to provide a chemically and dimensionally stable, insulating firebrick, and especially one which will resist reaction with, or reduction by, the protective atmosphere, all to the end of extending the useful life of the firebrick lining and keeping the protective atmosphere dry and uncontaminated.

According to the present invention, the firebrick is essentially free of ingredients which are reducible at 2750 to 2800° F. in a hydrogen atmosphere having a dew point as low as —75° F. Thus, the oxides of the materials involved are in equilibrium with their metals and/or sub-oxides in the environmental conditions previously described. As a result, no chemical reaction with the reducing gas takes place, and firebrick disintegration and moisture formation from this source are avoided.

Preferably, the firebrick is made by combining various proportions of refractory material, wood or other combustible or eliminatable particles and water, the solid materials first being mixed dry, water then added and the whole being mixed; then molding the mixture, and finally firing the dried shapes to burn out the combustibles or remove the eliminatable particles of the mixture under such conditions as avoid disintegration of the shapes and preserve the cellular structure created by the elimination of such particles while, at the same time, rendering the product porous.

One manner in which the invention has been commercially practiced is to form a dry batch mixture according to the following formula:

| | Percent by weight |
|---|---|
| Alumina | 66.5 |
| Plaster of Paris | 12.25 |
| Wood flour | 17.0 |
| Aluminum fluoride | 4.0 |
| Potter's flint | 0.25 |

The foregoing materials for the batch are finely divided and commercially dry, that is to say they contain only the normal moisture content incident to storage in the air.

These dry materials are paddle mixed in a container for a time interval such that there is an intimate homogeneous association of the particles of the mass.

The dry batch is then similarly paddle mixed with water added in sufficient quantity to form a solidifiable mass of relatively high viscosity, thus conditioning the mix for the step of forming into shapes. To form a flowable, castable mixture of the above batch, water was added in an amount equal to 62% by weight; but atmospheric conditions, the type, amount and condition of the starting materials, and the character of forming step to be used dictate the actual relationship of amount of added water to dry materials. The shapes may be formed by extrusion and wire cutting or by casting to shape in molds, or by casting a slab and wire cutting.

After formation of the brick shapes and recrystallization of the plaster of Paris, it will be found that while still wet they are, nevertheless, in condition to be readily transported and placed in the kiln.

The wet shapes are placed in the entrance of a tunnel kiln where they are immediately subjected to hot gases at a temperature of 1400° F., which is gradually increased over a time interval, say one hour, to 1700° F. during which there is complete distillation and carbonization of the combustible particles.

At approximately the stage where carbonization of the combustible particles is complete throughout the brick shapes, and when there is no further danger of uncontrollable combustion of the same adding to the temperature of the kiln, the temperature is elevated over a suitable time interval, say 12 hours, to 3000° F. The carbon particles are thus completely eliminated, leaving minute voids or cells in the fired residue of the molded shape.

The kiln temperature is gradually reduced to about 700° F. over about another 12 to 13 hour interval, and the finished bricks are subsequently removed from the kiln. Although the invention is generally applicable to the production of fired refractory shapes, the resulting product is a light weight, insulating firebrick, volume stable to at least 2800° F., analytically containing 98.0 to 99.8% of $Al_2O_3$ and CaO, the ratio of CaO to $Al_2O_3$ being about 5 to 95.

A firebrick made as described is substantially free of materials which are reducible at 2750° F. in a hydrogen atmosphere having dew points as low as minus 75° F.

*Modifications affecting density and porosity*

Wood flour is added to the alumina-plaster mixture in order to give the desired porosity and fired density to the product because, as mentioned previously, the wood flour is carbonized and oxidized so as to leave minute voids or cells in the shape. These characteristics can be varied, depending upon the weight of the product desired; but higher densities are obtained at a sacrifice of strength. In the foregoing example, using 17% wood flour, a 9 inch firebrick weighing 2.9 lbs. and having a volume of approximately 101 cubic inches is obtained. When it is desired to produce a more porous, lower density insulating firebrick, larger amounts of wood flour are employed in the mixture, but preferably not exceeding 25% by weight so that after firing the cellular product will have the strength to resist breakage during handling and shipping. On the other hand, the percentage of wood flour should be not less than 10% so that the resultant product will have sufficient porosity to be useful as insulating firebrick. Thus, the batch mixture should contain 10 to 25% wood flour.

Satisfactory light-weight and porous firebrick can also be made by including a combination of foam and wood flour in the mixture. A method of manufacturing brick structures with the addition of a foaming agent is described in U.S. Patent No. 2,318,574 of Isaac Harter, Charles L. Norton, and Charles L. Norton, Jr., granted May 4, 1943 and assigned to The Babcock & Wilcox Company. As mentioned in that patent, it is preferred that a foaming agent be employed which is from the class of synthetic surface active chemicals consisting of sulphonated fatty alcohols, and particularly those forming alkyl sulphuric acid esters, i.e. $C_nH_{2n+1}OSO_2ONa$. More specifically, $C_{12}H_{25}O(SO_3)Na$, the dry sodium salt of the sulfuric ester of lauryl alcohol, sold as a detergent under the trade name "Duponol," is a highly effective foaming agent which is completely stable in the presence of alkaline compounds such as lime or calcium hydroxide, and thus cannot interfere either with the foaming action or with the subsequent setting action of the hydraulic binder, plaster of Paris. The foaming agent is preferably combined with water and compressed air, then introduced and subsequently mixed into the mass as a preformed, stable foam, but the foam could be incorporated in the mix in other ways.

For example, a batch mixture was formed of finely divided dry ingredients according to the following formula:

| | Percent by weight |
|---|---|
| Alumina | 73.3 |
| Plaster of Paris | 12.65 |
| Wood flour | 13.8 |
| Kona flint | 0.25 |

After paddle mixing of the dry ingredients, water was added to the dry batch in an amount equal to 50% by weight of the dry ingredients, an amount sufficient to form a flowable, castable mixture which was also paddle mixed. To this there was added the preformed foam described above in an amount sufficient to substantially increase the volume of the mixture to the desired level. Subsequent formation of brick shapes, hydraulic setting, and then firing in a kiln at a temperature gradually increased from 2200° F. to 3000° F. over a 12 to 13 hour period and next gradually reduced to 700° F. over another 13 hour period, produced firebrick made according to the previous example with a much larger percentage of wood flour in the raw batch.

This second example illustrates, therefore, that insulating firebrick having the requisite density and porosity can be produced by employing a combination of foam and wood flour in the batch mixture. It has been found, however, that foam alone should not be substituted for wood flour to achieve porosity and low density, or else the risk of cracking in the kiln or in service will be increased.

*Undesired impurities*

The oxides of iron and titanium are most undesirable in the finished product because they are readily reduced in a hydrogen atmosphere, even at relatively low temperatures. For example, the oxides of iron are readily reduced in a hydrogen atmosphere below 600° F. The oxides of titanium are reducible at somewhat higher temperatures in a low dew point hydrogen atmosphere. Even the common refractory material silica is susceptible to reduction to elemental silicon, for instance, at temperatures above 2600° F. in a hydrogen atmosphere having a dew point lower than −40° F.

The dew point of the hydrogen atmosphere is an indication of the amount of water vapor present. For example, if hydrogen gas contained 0.0015% water vapor, it would have a dew point of −80° F., and this infinitesimal amount of water is sufficient to cause oxidation of chromium up to a chamber temperature of 1350° F.

*Ingredients affecting strength and hardness*

The addition of crystaline quartz, such as Potter's flint or Kona flint, to the mixture adds considerable strength and hardness to the resulting product after firing at an elevated temperature, for example 3000° F. The additional of from ⅛% to ½%, and preferably 0.25%, crystalline quartz by weight produces optimum results; but amounts up to about 2% by weight are beneficial. A hard finished structure is desirable because it is more durable, especially when exposed to abrasive action and other kinds of wear. Furthermore, without the inclusion of crystalline quartz in the mixture, the requisite firing temperature of the refractory shape must be elevated to approximately 3200° F., and the extra fuel and firing time adds to the overall cost of the product.

It is a feature of the present invention that the crystalline quartz, which is a form of silica, is not found in the finished article after firing. It is believed that, during firing of the brick, the crystalline quartz combines chemically with the alumina and lime to form calcium aluminum silicate, a stable refractory material which is not readily reducible in a hydrogen atmosphere. As a result, the advantages of crystalline quartz are utilized during the manufacture of the firebrick, and yet the substance is converted to a stable refractory material during manufacture so that it is not present as an undesirable impurity in the finished product.

*Other ingredients*

Plaster of Paris is included in the mix for the purpose of acting as a hydraulic setting agent, and comprises from 8 to 30%, by weight, of the dry ingredients. If more than 30%, by weight, of the dry mix is plaster of Paris there will be undue lowering of the refractoriness of the final product. On the other hand, if less than 8%, by weight, of the dry mix is plaster of Paris, the shape after setting of the dry mix in the mold will have insufficient strength to endure further in the manufacturing steps without excessive breakage and without causing other production difficulties. Optimum results are achieved when the plaster of Paris is 12.5%, by weight, of the dry ingredients.

Of course, when plaster of Paris is combined with water, there is formed a solidifiable, wet, flowable mass. After the wet mass is hydraulically set, it is then fired, giving off all $SO_2$ as a gas and leaving CaO.

The inclusion in the dry mixture of up to 10% aluminum fluoride, by weight, permits the firing schedules to be more flexible. Certain firing gradients which permit rapid cycling of the kiln can be employed with minimum risk of cracking and/or exploding of the refractory shape during firing. Optimum results are achieved with the inclusion of 4% aluminum fluoride, by weight, in the dry mix. If aluminum fluoride is omitted from the mixture the composition will undergo excessive shrinkage during firing.

During firing, fluorine gas evolves from the aluminum fluoride, with aluminum combining with free oxygen to form alumina, $Al_2O_3$.

The remaining ingredient in the original dry mix is $Al_2O_3$, alumina, comprising about 61% to 82% of the dry mix. When preferred amounts of wood flour, aluminum fluoride, and crystaline quartz are utilized, the dry mix will contain about 66.5% alumina. Accordingly, the ratio of CaO to $Al_2O_3$ in the finished product is in the range of between 17 to 83 and 4 to 96.

Alumina is a stable refractory material which is not readily reduceable at or below 3000° F. in a hydrogen atmosphere having a dew point as low as minus 100° F.

As in the case of the other dry ingredients, it is preferred that alumina be finely divided and chemically pure $Al_2O_3$. It has been found that low-soda calcined alumina, grade A–10, and tabular alumina, grade T–60, both marketed under the Alcoa trade name, are highly effective, stable refractory materials having the requisite purity. Grade A–10 alumina is about 99.5% pure, and it is available as nominal minus 325 mesh material, which is ground to ultimate crystal size of 6 to 10 microns by high-alumina ceramic grinding media instead of steel balls in order to eliminate iron contamination. Grade T–60 tabular alumina is a sintered alumina characterized by more than 99.5% purity and low shrinkage, having been ground to minus 325 mesh, dry-pressed at 10,000 p.s.i., and fired for one hour at 3270° F.

Conclusions

From the foregoing it can be seen that firebrick made according to the present invention is essentially free of ingredients which are reducible at or below 2750° F. in a hydrogen atmosphere having dew points as low as minus 75° F. Thus, the ingredients of the finished firebrick will not disintegrate as a result of reduction by the hydrogen and moisture will not be formed.

Although there has been disclosed herein the best form of the invention and the best methods for making the same, it will be obvious to those skilled in the art that it is susceptible of changes and modifications without departing from the spirit of the invention as covered by the following claims.

What is claimed is:

1. A method for manufacturing a refractory article, essentially free of ingredients which are reducible in a high temperature hydrogen atmosphere having a low dew point, comprising the steps of forming a raw batch consisting essentially of a dry mix plus sufficient water to render the batch flowable, said dry mix being a mixture, by weight, of about from 61% to 82% alumina, from 8% to 30% plaster of Paris, from 10 to 25% wood flour, up to 10% aluminum fluoride, and ⅛ to 2% crystalline quartz, forming the article into a shape from said raw batch, and then firing the shape, the aluminum fluoride being present in an effective amount sufficient to prevent excessive shrinkage during firing.

2. A method for manufacturing porous insulating brick characterized by high resistance to reduction of its oxidic refractory ingredients in a hydrogen atmosphere at temperatures up to 2800° F., comprising the steps of forming a solidifiable mass containing 61% to 82% alumina, 8% to 30% plaster of Paris, an effective amount up to 10% of aluminum fluoride sufficient to prevent excessive shrinkage during firing, 10% to 25% wood flour, and ⅛ to 2% crystalline quartz, and water in sufficient quantity to render the mass flowable; mechanically agitating the mass; introducing into said mass a foam made from water and a small amount of foaming agent stable in the presence of alkaline compounds; mechanically agitating the mass until the mass is thoroughly mixed; molding the mass into shapes and allowing them to hydraulically set, and then firing the set shapes.

3. The method according to claim 1 wherein said mixture consists of about 66.5% alumina, 12.25% plaster of Paris, 17.0% wood flour, 4.0% alumina fluoride, and 0.25% crystalline quartz.

4. The method according to claim 2 wherein the set shapes are wet at the beginning of said firing step.

References Cited by the Examiner

UNITED STATES PATENTS 2,588,646  3/1952  Miller et al. _____ 106—40

FOREIGN PATENTS 315,205  7/1929  Great Britain.
487,957  6/1938  Great Britain.

TOBIAS E. LEVOW, *Primary Examiner.*

HELEN M. McCARTHY, *Examiner.*

J. E. POER, *Assistant Examiner.*